(12) United States Patent
Fanberg et al.

(10) Patent No.: US 9,605,909 B2
(45) Date of Patent: Mar. 28, 2017

(54) REMOVABLE RADIATOR FIN ASSEMBLY (71) Applicant: Fab Tek Logic, LLC, Edina, MN (US)

(72) Inventors: Gordon B. Fanberg, Edina, MN (US); Robert A. Fransen, Minneapolis, MN (US)

(73) Assignee: Fab Tek Logic, LLC, Edina, MN (US)

( * ) Notice: Subject to any disclaimer, the term of this patent is extended or adjusted under 35 U.S.C. 154(b) by 37 days.

(21) Appl. No.: 13/945,188

(22) Filed: Jul. 18, 2013

(65) Prior Publication Data
US 2014/0020880 A1    Jan. 23, 2014

Related U.S. Application Data (60) Provisional application No. 61/673,005, filed on Jul. 18, 2012.

(51) Int. Cl.
*F28F 1/30* (2006.01)
*B23P 15/26* (2006.01)
*F28F 3/06* (2006.01)

(52) U.S. Cl.
CPC ............... *F28F 1/30* (2013.01); *B23P 15/26* (2013.01); *F28F 3/06* (2013.01); *F28F 2280/10* (2013.01); *F28F 2280/105* (2013.01); *Y10T 29/49378* (2015.01)

(58) Field of Classification Search
CPC .. F28F 1/30; F28F 3/06; F28F 2280/02; F28F 2280/10; F28F 2280/105; B21C 37/24
USPC ......................................... 165/77, 181, 182
See application file for complete search history.

(56) References Cited

U.S. PATENT DOCUMENTS

| | | | |
|---|---|---|---|
| 1,705,572 A | | 3/1929 | Karmazin |
| 1,818,592 A | | 8/1931 | Walworth |
| 1,865,794 A | * | 7/1932 | Schlafman ..................... 165/182 |
| 1,896,501 A | * | 2/1933 | Whitaker ....................... 165/182 |
| 2,067,597 A | * | 1/1937 | Chilton .................. F02F 1/065 165/77 |
| 2,537,984 A | * | 1/1951 | Frisch ........................... 165/182 |

(Continued)

FOREIGN PATENT DOCUMENTS

| | | |
|---|---|---|
| GB | 587285 | 4/1947 |
| GB | 672721 | 5/1952 |

(Continued)

*Primary Examiner* — Len Tran
*Assistant Examiner* — Hans Weiland
(74) *Attorney, Agent, or Firm* — Thomas J. Oppold; Larkin Hoffman Daly & Lindgren, Ltd.

(57) ABSTRACT

A removable radiator fin assembly adapted to removably receive a radiator pipe. The removable fin assembly includes a first plurality of fins and a second plurality of fins having collar flanges sized to receive a radiator pipe. The fins are received on first and second spacer rods, respectively and are hingedly connected by a hinge rod such that the first and second plurality of fins are pivotally movable about the hinge rod between an open position and a closed position. In the open position, the first and second plurality of fins are positionable over the radiator pipe. In the closed position, the collar flanges of the first and second plurality of fins substantially surround the radiator pipe. A fin clamp secures the first and second plurality of fins together in the closed position about the radiator pipe.

14 Claims, 7 Drawing Sheets

(56) References Cited

U.S. PATENT DOCUMENTS

| | | | |
|---|---|---|---|
| 2,574,142 A | | 11/1951 | Buongirno |
| 2,624,555 A | * | 1/1953 | Di Vincenzo ................... 165/77 |
| 2,726,850 A | * | 12/1955 | Buongirno ...................... 165/77 |
| 3,190,353 A | | 6/1965 | Storfer |
| 3,216,095 A | | 11/1965 | Kurtz et al. |
| 3,231,012 A | | 1/1966 | Norris |
| 3,373,803 A | * | 3/1968 | Steinberg et al. ............ 165/182 |
| 3,847,213 A | | 11/1974 | Stich |
| 4,226,012 A | | 10/1980 | Essebaggers |
| 4,648,443 A | * | 3/1987 | Szucs et al. ................... 165/181 |
| 5,309,982 A | * | 5/1994 | Aliano ...................... F28F 1/30 165/181 |
| 6,827,140 B2 | | 12/2004 | Lin |
| 7,059,392 B2 | | 6/2006 | Kovac |
| 7,231,963 B2 | | 6/2007 | Lee et al. |
| 2006/0249277 A1 | | 11/2006 | Riondet et al. |
| 2011/0139400 A1 | | 6/2011 | Hallmann et al. |

FOREIGN PATENT DOCUMENTS

| | | |
|---|---|---|
| GB | 707738 | 4/1954 |
| GB | 1417457 | 12/1975 |
| WO | WO88/06260 | 8/1988 |

* cited by examiner

REMOVABLE RADIATOR FIN ASSEMBLY

CROSS-REFERENCE TO RELATED APPLICATIONS

This is application claims the benefit of U.S. Provisional Application No. 61/673,005, filed, Jul. 18, 2012.

BACKGROUND

Hot water baseboard style radiator systems are used extensively in residential and commercial buildings. Such systems typically utilize copper pipes having closely spaced aluminum fins (often called "finned tubes") that run along the length of a wall. The finned tubes are typically covered by a housing or cover panel for decorative purposes, protection of the fins, and to promote convection currents. In operation, hot water flows through the pipes heating the pipes. Heat is transferred from the hot pipes to the fins by conduction. Due to the large surface area of the fins, heat is transferred to the surrounding air. As the air is warmed as it passes between the fins, the warm air rises and the cooler air is drawn toward the finned tubes creating a natural convection current.

The aluminum fins of the finned tube are fixed to the copper pipes through a process known as swedging to provide a tight fit and uniform contact between the fins and the tube thereby securing the fins in place along the pipe and ensuring efficient heat conduction. However, the aluminum fins can often become bent or damaged from impact thereby reducing air flow between the fins which can affect the efficiency of heat transfer from the fins to the surrounding air. Because the fins are fixed to the pipes, the fins are not easily replaceable without replacing an entire section of the finned tube which may extend for many feet. Additionally, finned tubes are typically available only in standard lengths unless the lengths are custom ordered at significantly higher cost than standard lengths. Thus, depending on room size or wall length, the standard length finned tubes may be too long for a particular wall or room, requiring the use of a shorter length standard finned tube than is desired or resulting in the decision to not provide a baseboard radiator on a particular wall. Similarly, when it is desired to move a wall in a residential or commercial building during remodeling where an existing baseboard style radiator is installed, it is often necessary to replace the entire length of the finned tube when, ideally, only a short section would need to be removed or added. Also if it becomes necessary to repair or replace a section of the radiator pipe, it is necessary to either replace the entire length of the finned tube containing the damaged pipe, or it is necessary to cut the fins away to exposed the damaged pipe section so the damaged pipe section can be cut and replaced, leaving a gap in the fins where the fins were cut away, resulting in unbalanced heat delivery.

Accordingly, there is a need for a removable radiator fin assembly which will provide a solution to the foregoing disadvantages of baseboard radiator systems with finned tubes having the fins fixed to the radiator pipes, and which provides better or nearly the same BTUs per hour per foot (BTU/hr/ft) as finned tubes with fixed fins of the same pipe size and fin size.

DETAILED DESCRIPTION

Figure 1:
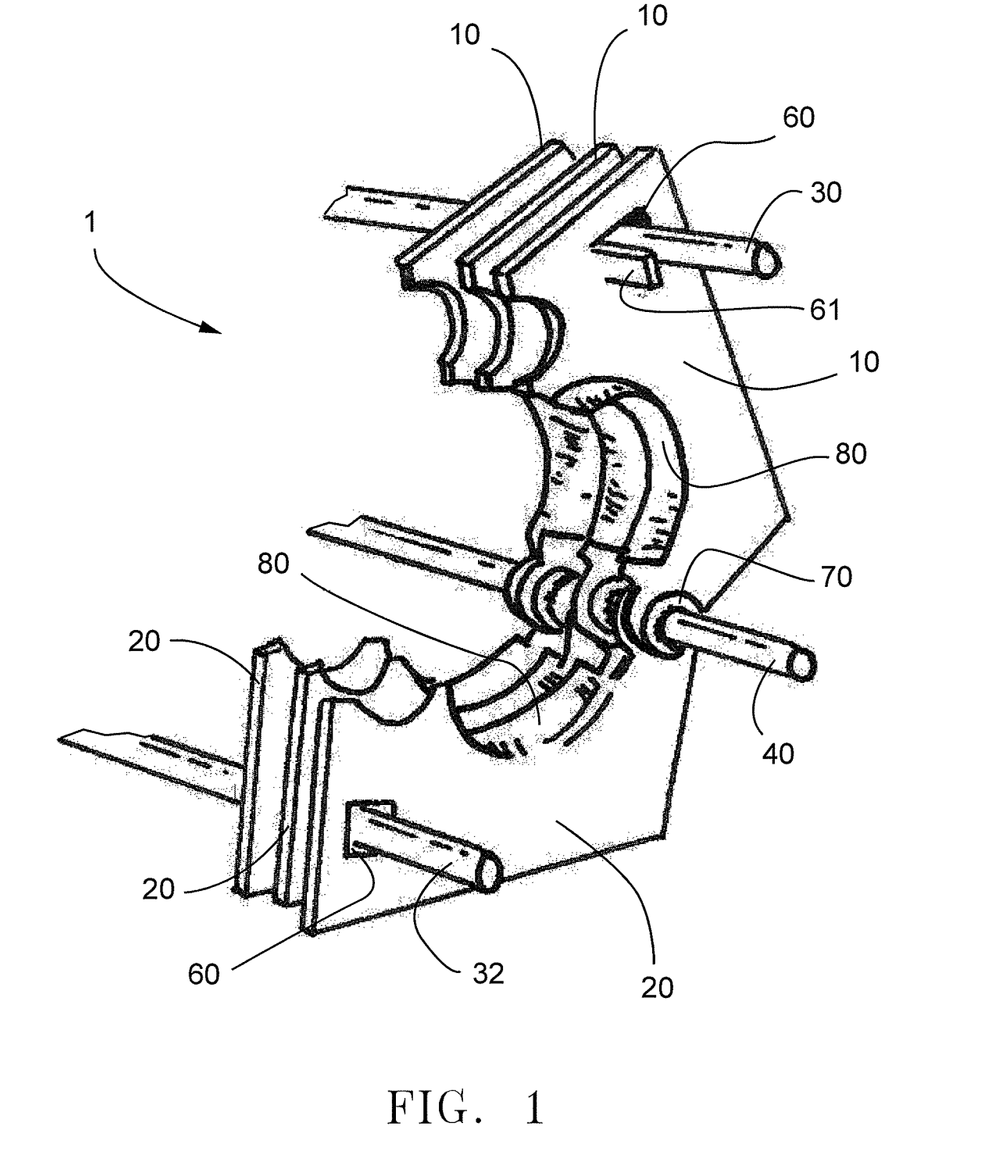
FIG. 1 is a perspective view showing one embodiment of a removable radiator fin assembly in an open position to receive a radiator pipe.

FIG. 1 is a perspective view showing an embodiment of a removable radiator fin assembly 1 comprising a first plurality of radiator fins 10 and a second plurality of radiator fins 20. Each of the first and second plurality of fins 10, 20 are preferably substantially identical and stamped from thin plate aluminum or other material which efficiently conducts and radiates heat.

Figure 2:
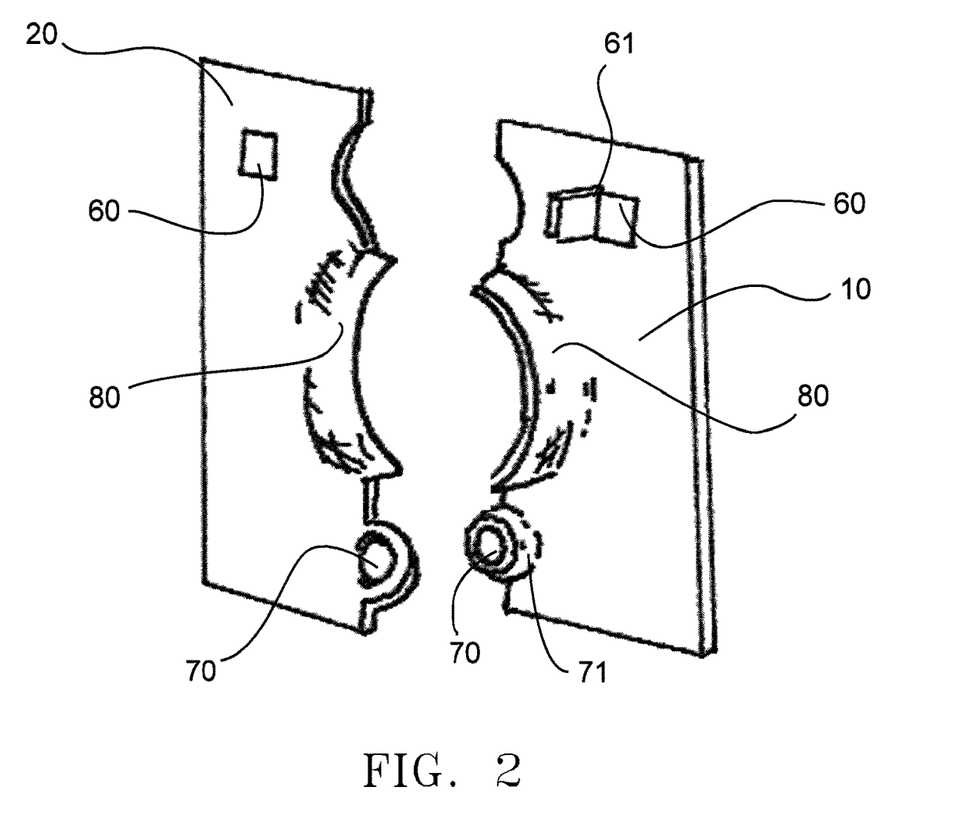
FIG. 2 is a perspective view of an embodiment of mating fins of the removable radiator fin assembly of FIG. 1.

Referring to FIG. 2, in one embodiment, each fin 10, 20 includes a spacer rod hole 60, a hinge rod hole 70 and a collar flange 80. The hinge rod hole 70 may be provided with a reinforcing ring 71 to reinforce the thin plate around the hinge rod hole. The spacer rod hole 60 may be stamped to produce a spacer tab 61 which may be bent outwardly to serve as a spacer between adjacent fins and to serve as a guide for the spacer rods 30, 32 (discussed below). The collar flange 80 is sized to receive the radiator pipe 100 as illustrated in FIG. 4

A spacer rod 30 extends through the spacer rod holes 60 of the first plurality of fins 10 and a second spacer rod 32 extends through the spacer rod holes 60 of the second plurality of fins 20. The fins 10, 20 are oriented on the spacer rods 30, 32 with the collar flanges 80 extending in the same direction such that the collar flanges 80 abut an adjacent fin thereby serving as spacers to ensure that the fins are equally spaced along the spacer rods 30, 32 to better and more uniformly radiate heat. The spacer tabs 61 may also serve as spacers and may serve as guides for the spacer rods 30, 32 as the rods are inserted through each of the spacer rod holes 60.

The spacer rods 30, 32, with the first and second plurality fins 10, 20 received respectively thereon, are oriented such that the collar flanges 80 and spacer tabs 61 of the first plurality of fins 10 extend in a first direction and the collar flanges 80 and spacer tabs 61 of the second plurality of fins 20 extend in a second direction opposite from the first direction. The hinge rod holes 70 of the first and second plurality of fins are then aligned to receive the hinge rod 40 therethrough, thereby pivotally joining the first plurality of fins 10 with the second plurality of fins 20, such that the first and second fins are pivotally movable between an open position (FIG. 1) and a closed position (FIG. 4). In the open position the first and second plurality of fins 10, 20 are positionable over the radiator pipe 100. In the closed position, the collar flanges 80 of the first and second plurality of fins 10, 20 substantially surround the radiator pipe 100. It should be appreciated that if the fins 10, 20 were instead stamped to be mirror images of one another, it would not be necessary to flip or orient the spacer rods so the collar flanges 80 and spacer tabs 61 are in the opposite direction to assemble the assembly 1.

Figure 3:
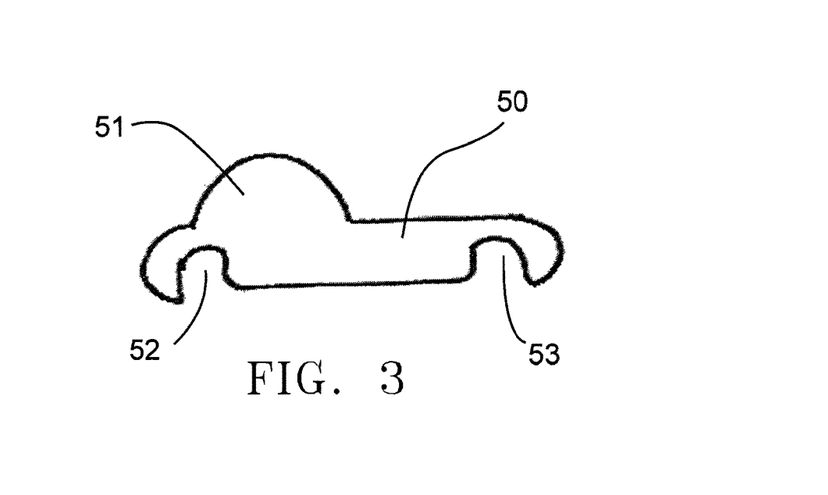
FIG. 3 is an elevation view of an embodiment of a clamp for securing the removable radiator fin assembly of FIG. 1 about a radiator pipe.
Figure 4:
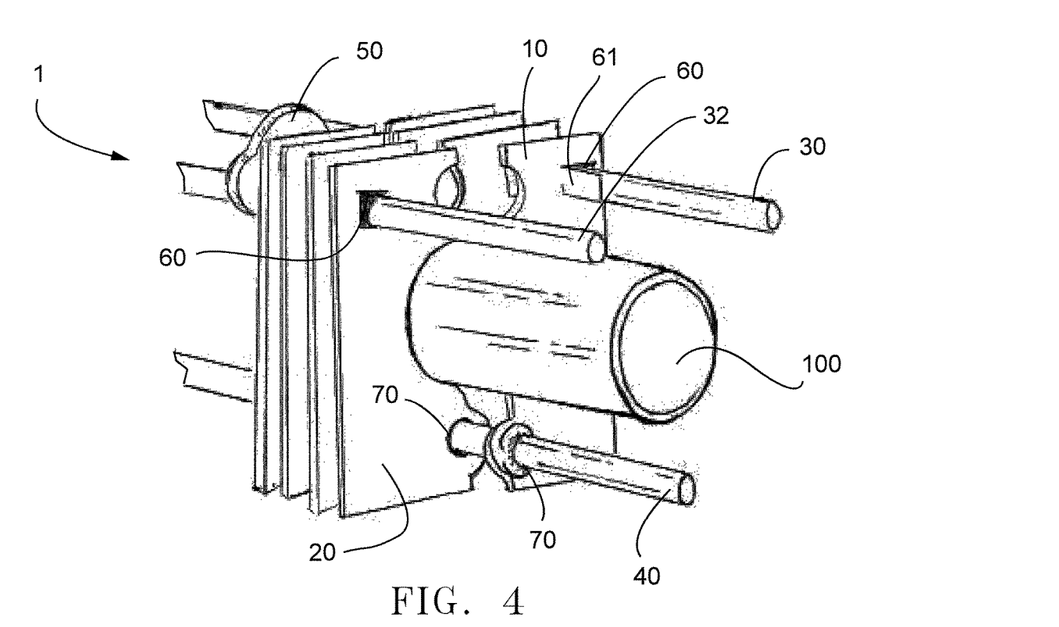
FIG. 4 is a perspective view showing the removable radiator fin assembly of FIG. 1 positioned around a radiator pipe.
Figure 5:
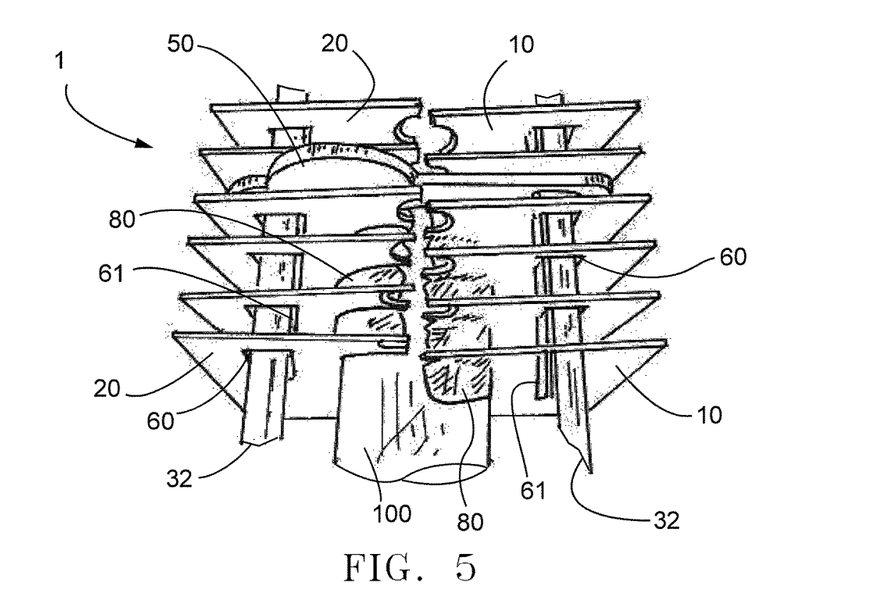
FIG. 5 is another perspective view of the removable radiator fin assembly of FIG. 4 positioned around a radiator pipe.

FIG. 3 illustrates an embodiment of a clamp 50 for securing the first and second plurality of fins 30, 32 together about the radiator pipe 100 in tight relation by snapping over the spacer rods 30 as best illustrated in FIGS. 4 and 5. The clamp 50 includes a tab 51 and a notches 52, 53. The notches 52, 53 are positioned over the spacer rods 30, and the clamp 50 is pressed downwardly forcing the spacer rods 30 into the notches 52, 53 thereby securing the first and second plurality of fins 10, 20 together by the clamp 50, with the other end of the fins 10, 20 being held together by the hinge rod 40.

Once the first and second plurality of fins 10, 20, and rods 30, 40 are assembled as described above, the assembly 1 is pivoted to the open position (FIG. 1) for placing over the radiator pipe 100. The assembly 1 is then secured in place by the clamp 50 as previously described and as shown in FIGS. 4 and 5.

The fins 10, 20, the fin clamps 50 and the collar flanges 80 may be made in various sizes to accommodate different sized piping, but preferably the parts are made according to standard pipe diameters typical for residential and commercial radiator systems. The lengths of the hinge rods and spacer rods, and thus the length of the assembly 1, are also preferably standardized in predetermined lengths but may be customized to any desired length. Thus, the assemblies may be used in residential and commercial applications, whether to replace missing fins after repairs have been made to piping or for new construction or repairs to balance heat delivery.

Figures 6, 7, 8:
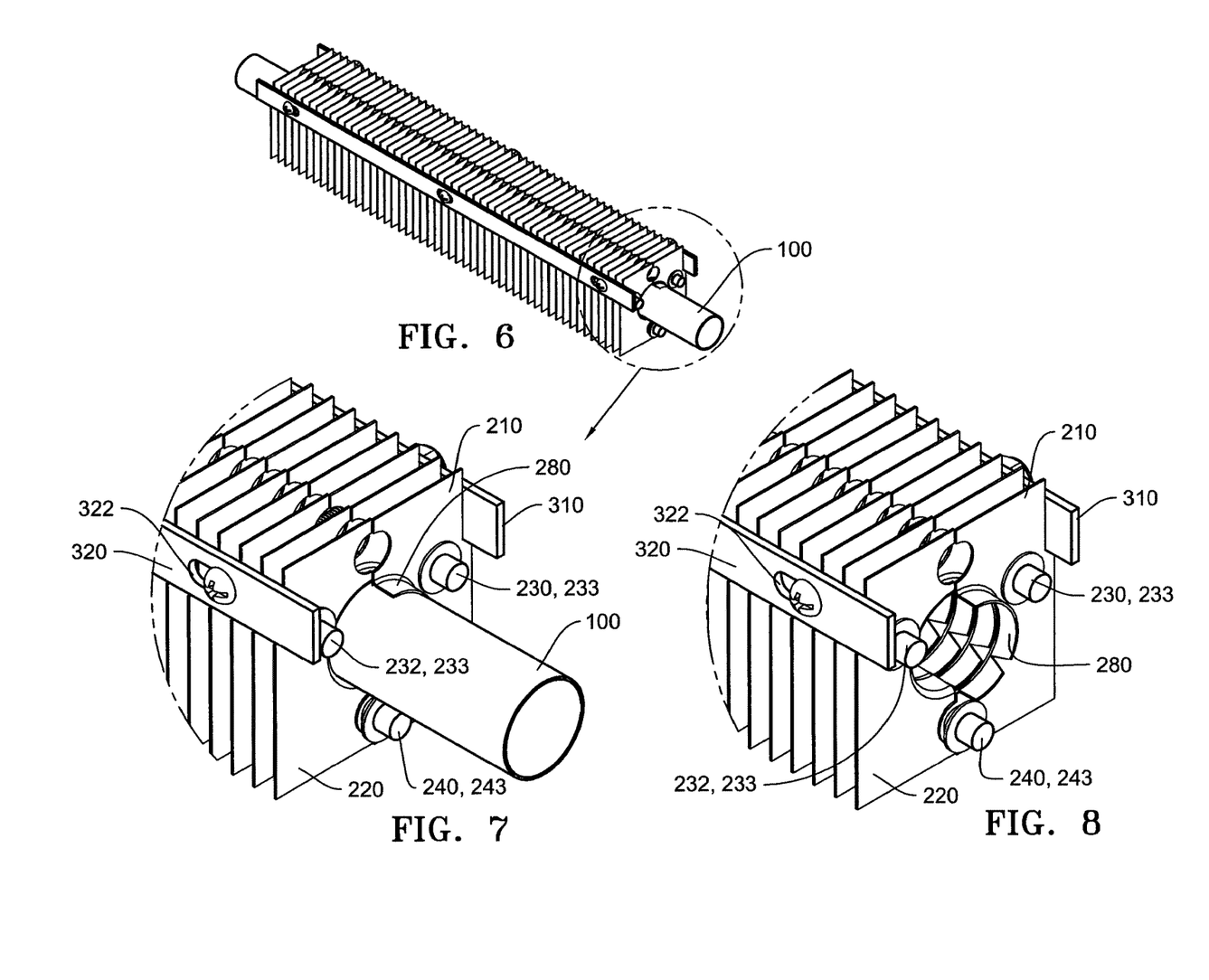
FIG. 6 is a perspective view of another embodiment of a removable radiator fin assembly positioned over a radiator pipe.
FIG. 7 is an enlarged perspective view of the circled portion of the removable radiator fin assembly of FIG. 6.
FIG. 8 is an enlarged perspective view of the circled portion of the removable radiator fin assembly of FIG. 6 with the radiator pipe removed.

FIG. 6 is a perspective view of an alternative embodiment of a removable radiator fin assembly 200. As in the previously described embodiment, each of the first and second plurality of fins 210, 220 are preferably substantially identical and are stamped from thin plate aluminum or other material which efficiently conducts and radiates heat.

Figure 9:
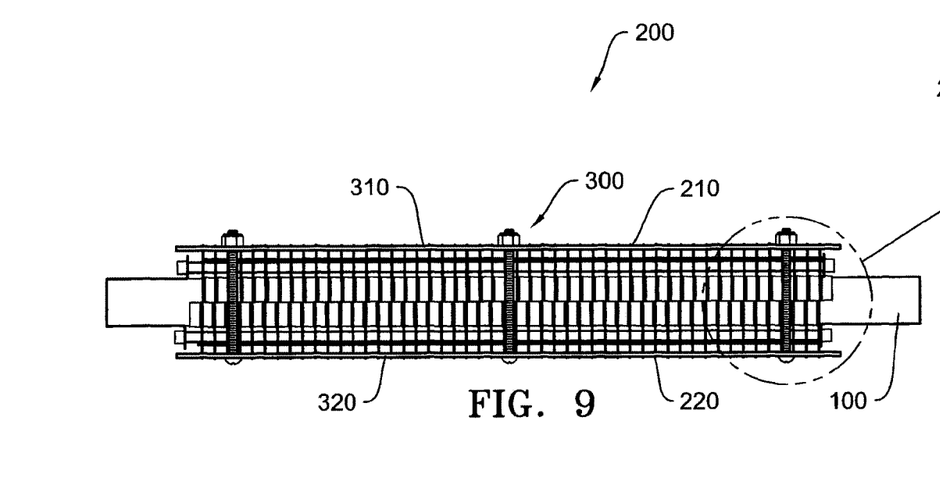
FIG. 9 is a top plan view of the removable radiator fin assembly of FIG. 6.
Figure 10:
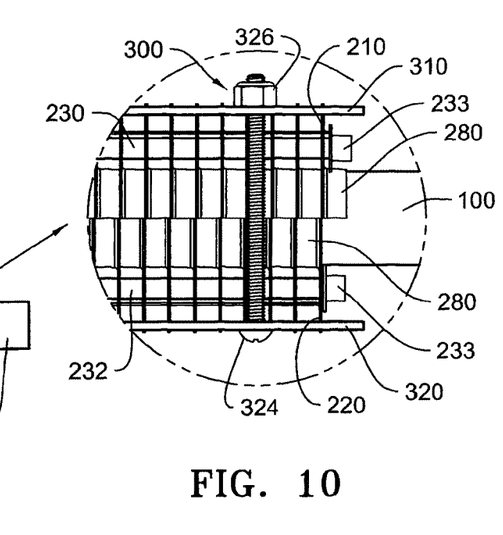
FIG. 10 is an enlarged view of the circled portion of the removable radiator fin assembly of FIG. 9.
Figure 11:
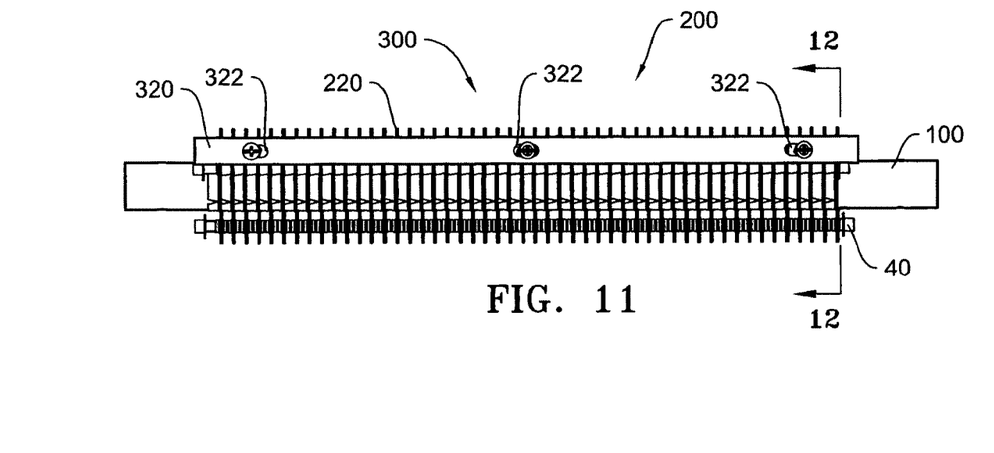
FIG. 11 is a side elevation view of the removable radiator fin assembly of FIG. 6.
Figure 14:
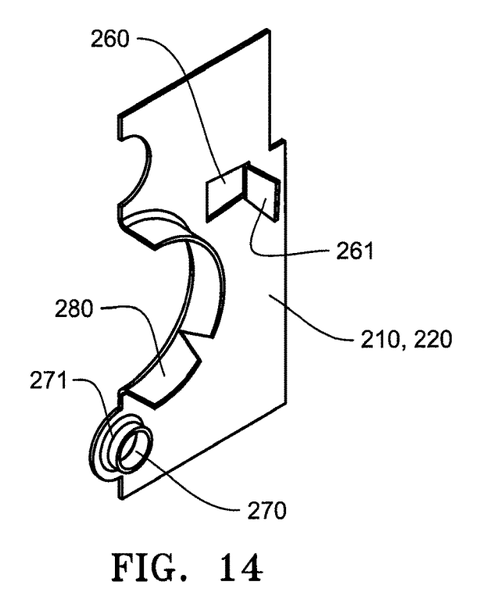
FIG. 14 is a perspective view of an embodiment of a fin of the removable radiator fin assembly of FIG. 6.
Figure 15:
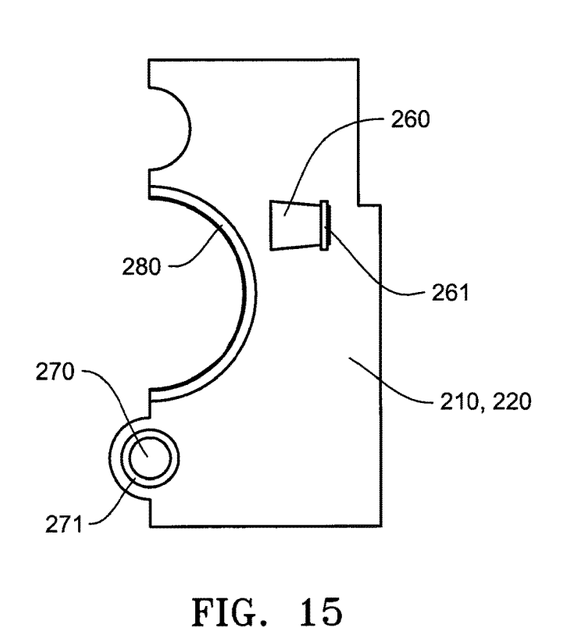
FIG. 15 is a front elevation view of the fin of FIG. 14.
Figure 16:
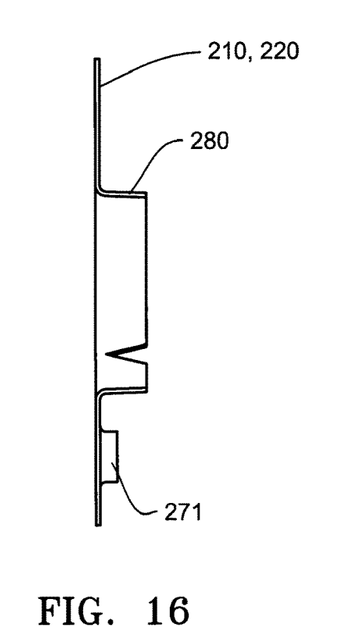
FIG. 16 is a side elevation view of the fin of FIG. 14.

Referring to FIGS. 14-16, in one embodiment, each fin 210, 220 includes a spacer rod hole 260, a hinge rod hole 270 and a collar flange 280. The hinge rod hole 270 may be provided with a reinforcing ring 271 to reinforce the thin plate around the hinge rod hole 270. The spacer rod hole 260 may be stamped to produce a spacer tab 261 which may be bent outwardly to serve as a spacer between adjacent fins and to serve as a guide for the spacer rods 230, 232. The collar flange 280 is sized to receive the radiator pipe 100 as best illustrated in FIGS. 9, 14 and 15. The fins 210, 220 may include a notch to receive the first and second bars 310, 320 of the fin clamp 300 (described later).

A spacer rod 230 extends through the spacer rod holes 260 of the first plurality of fins 210 and a second spacer rod 232 extends through the spacer rod holes 260 of the second plurality of fins 220. The fins 210, 220 are oriented on the respective spacer rods 230, 232 with each of the collar flanges 280 extending in the same direction such that the collar flanges 280 abut an adjacent fin thereby serving as spacers to ensure that the fins are equally spaced along the spacer rods 30, 32 to better and more uniformly radiate heat. The spacer tabs 261 may also serve as spacers and may serve as guides for the spacer rods 230, 232 as the rods are inserted through each of the spacer rod holes 260. Spacer rod caps 233 may be used to retain the fins 210, 220 on the spacer rods 230, 232.

Figure 12:
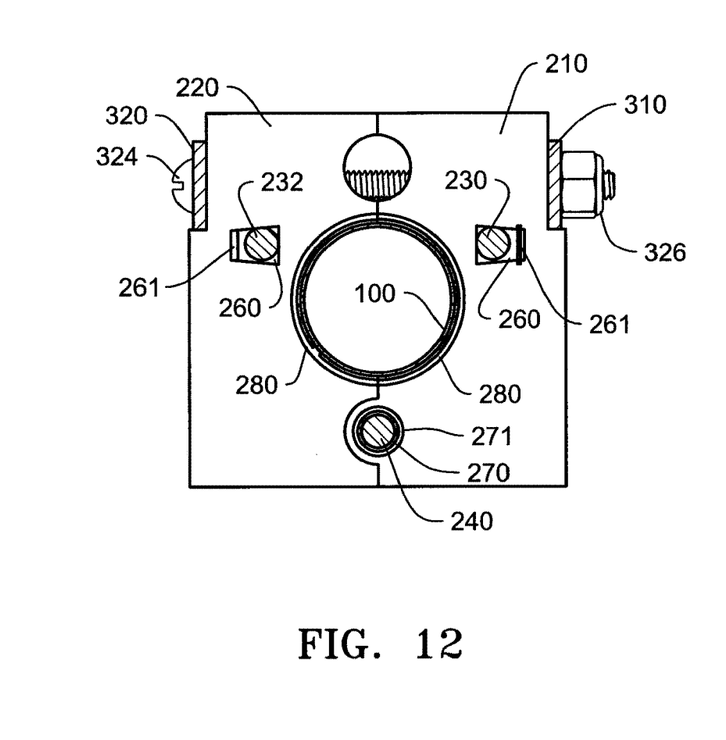
FIG. 12 is a cross-sectional view as viewed along lines 12-12 of the removable radiator fin assembly of FIG. 11.
Figure 13:
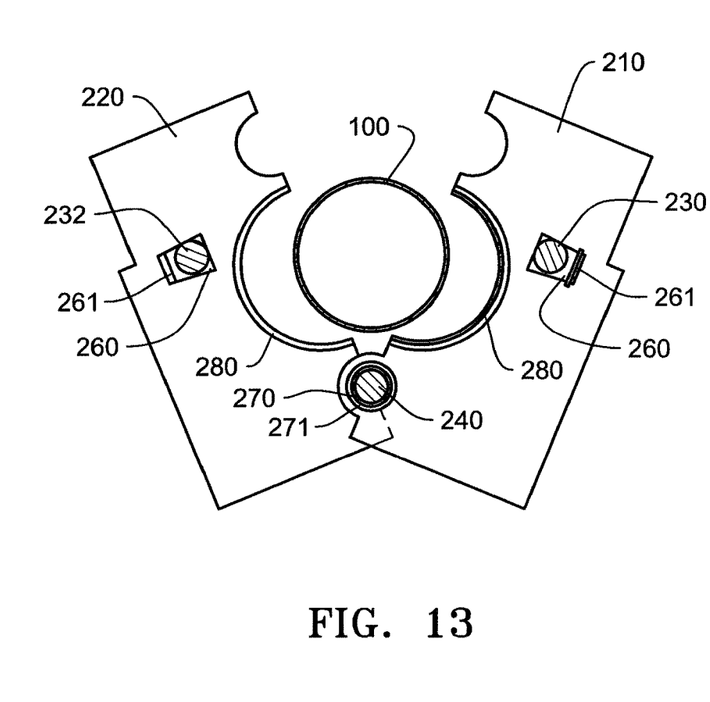
FIG. 13 is the same view as FIG. 12, but showing the radiator fin assembly in the open position to received the radiator pipe.

The spacer rods 230, 232, with the first and second plurality of fins 210, 220 received respectively thereon, are flipped or oriented such that the collar flanges 280 and spacer tabs 261 of the first plurality of fins 210 extend in a first direction and the collar flanges 280 and spacer tabs 261 of the second plurality of fins 220 extend in a second direction opposite from the first direction. The hinge rod holes 270 of the first and second plurality of fins are then aligned to receive the hinge rod 240 therethrough, thereby pivotally joining the first plurality of fins 210 with the second plurality of fins 220, such that the first and second fins are pivotally movable between an open position (FIG. 13) and a closed position (FIG. 12). In the open position the first and second plurality of fins 210, 220 are positionable over the radiator pipe 100. In the closed position, the collar flanges 280 of the first and second plurality of fins 210, 220 substantially surround the radiator pipe 100 and the assembly 200 is secured onto the pipe by a fin clamp 300. Hinge rod caps 243 may be used to retain the fins 210, 220 on the hinge rods 240.

It should be appreciated that if the fins 210, 220 were instead stamped to be mirror images of one another, it would not be necessary to flip or orient the spacer rods so the collar flanges 280 and spacer tabs 261 are in the opposite direction to assemble the assembly 200.

In one embodiment as illustrated in FIGS. 6-12, the fin clamp 300 comprises first and second bars 310, 320 which are positioned on opposite sides the first and second fins when in the closed position. The bars 310, 320 included elongated holes 322 spaced along their lengths. Threaded fasteners, such as stove bolts 324 and nuts 326 restrain the first and second fins together about the radiator pipe. In the embodiment illustrated in FIGS. 6-12, the stove bolts 324 extend through the holes 322 in the bars 310, 320, passing between the adjacently spaced first fins and second fins 210, 220. By tightening the nuts 326 onto the stove bolts 324, the collar flanges 280 are drawn toward the radiator pipe 100 to ensure tight contact between the collar flanges 280 and the radiator pipe 100 to improve heat transfer from the pipe 100 to the fins 210, 220.

As in the previous embodiment, the fins 210, 220, the fin clamp assembly 300 and the collar flanges 280 may be made in various sizes to fit around any diameter of piping, but preferably the parts are made according to standard pipe diameters typical for residential and commercial radiator systems. The lengths of the hinge rod 40 and spacer rods 30, and thus the length of the assembly 200, is also preferably standardized in predetermined lengths but may be customized to any desired length. The assembly 200 may therefore be used in residential and commercial applications, whether to replace missing fins after repairs have been made to piping or for new construction or repairs to balance heat delivery.

It has been found that each of the removable radiator assembly embodiments described above and illustrated in the drawings provides better or nearly the same BTUs per hour per foot (BTU/hr/ft) as finned tubes with fixed fins of the same pipe size and fin size.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A removable radiator fin assembly adapted to removably receive a radiator pipe, comprising:
    a first plurality of adjacently spaced fins, each having a collar flange projecting outwardly from a face thereof, the collar flange sized to receive a portion of the radiator pipe, each of the first plurality of fins further having a spacer rod hole and a hinge rod hole;
    a second plurality of adjacently spaced fins, each having a collar flange projecting outwardly from a face thereof, the collar flange sized to receive a portion of the radiator pipe, each of the second plurality of fins further having a spacer rod hole and a hinge rod hole;
    a first spacer rod extending through the spacer rod holes of each of the first plurality of adjacently spaced fins, thereby producing a first fin subassembly;
    a second spacer rod extending through the spacer rod holes of each of the second plurality of adjacently spaced fins, thereby producing a second fin subassembly;
    a singular hinge rod extending through the hinge rod hole of each of the plurality of first and second adjacently spaced fins of the respective first fin subassembly and second fin subassembly, thereby producing a single unitary assembly in which the first and second fin subassemblies are pivotally movable about the singular hinge rod between an open position and a closed position, wherein, in the open position, the first fin subassembly and second fin sub assembly are removably positionable over the radiator pipe, and wherein, in the closed position, the collar flanges of the first and second plurality of fins of the respective first and second fin subassemblies substantially surround the radiator pipe; and
    a fin clamp removably securing the first and second fin subassemblies together in the closed position about the radiator pipe;
    whereby said first and second fin subassemblies are removable from around the radiator pipe together as the single unitary assembly, after removing the fin clamp and pivoting the first and second fin subassemblies about the singular hinge rod from the closed position to the open position.

2. The removable radiator fin assembly of claim 1 wherein the collar flanges serve as spacers between adjacent ones of the first and second plurality of fins.

3. The removable radiator fin assembly of claim 1 wherein each of the first and second plurality of fins includes a spacer tab projecting outwardly from the face of the respective first and second plurality of fins.

4. The removable radiator fin assembly of claim 3 wherein the spacer tabs serve as spacers between adjacent ones of the first and second plurality of fins.

5. The removable radiator fin assembly of claim 1 wherein the first plurality of fins are oriented on the hinge rod with the collar flanges extending only in a first direction and wherein the second plurality of fins are oriented on the hinge rod with the collar flanges extending only in a second direction opposite the first direction.

6. The removable radiator fin assembly of claim 1 wherein the fin clamp secures to the first and second spacer rods.

7. The removable radiator fin assembly of claim 1 wherein the fin clamp comprises a first bar and a second bar and a plurality of threaded fasteners, the first and second bars removably disposed on opposite sides of the first and second fin subassemblies when in the closed position, the plurality of threaded fasteners extend transversely between the first and second bars thereby restraining the first and second fin subassemblies between the first and second bars.

8. A method of removably attaching fins to a radiator pipe, comprising:
    placing a first plurality of fins in adjacently spaced relation onto a first spacer rod to produce a first fin subassembly, each of the first plurality of fins having a collar flange projecting outwardly from a face thereof, the collar flange sized to receive a portion of the radiator pipe, each of the first plurality of fins further having a spacer rod hole and a hinge rod hole, the first spacer rod extending through the spacer rod hole of each of the first plurality of fins;
    placing a second plurality of fins in adjacently spaced relation onto a second spacer rod to produce a second fin subassembly, each of the second plurality of fins having a collar flange projecting outwardly from a face thereof, the collar flange sized to receive a portion of the radiator pipe, each of the second plurality of fins further having a spacer rod hole and a hinge rod hole, the second spacer rod extending through the spacer rod hole of each of the second plurality of fins;
    inserting a singular hinge rod through the hinge rod hole of each of the plurality of first and second adjacently spaced fins of the respective first fin subassembly and second fin subassembly, thereby producing a single unitary assembly in which the first and second fin subassemblies are pivotally movable about the singular hinge rod between an open position and a closed position;
    with the first and second fin subassemblies positioned in the open position, placing the first and second fin subassemblies over the radiator pipe;
    moving the first and second fin subassemblies to the closed position with the radiator pipe received within the collar flanges of the first and second plurality of fins of the respective first and second fin subassemblies; and
    removably securing the first and second fin subassemblies together about the radiator pipe with a fin clamp;
    whereby said first and second fin subassemblies are removable from around the radiator pipe together as the single unitary assembly, after removing the fin clamp and pivoting the first and second fin subassemblies about the singular hinge rod from the closed position to the open position.

9. The method of claim 8 wherein the collar flanges serve as spacers between adjacent ones of the first and second plurality of fins.

10. The method of claim 8 wherein each of the first and second plurality of fins includes a spacer tab projecting outwardly from the face of the respective first and second plurality of fins.

11. The method of claim 10 wherein the spacer tabs serve as spacers between adjacent ones of the first and second plurality of fins.

12. The method of claim 8 wherein the first plurality of fins are oriented on the hinge rod with the collar flanges extending only in a first direction and wherein the second plurality of fins are oriented on the hinge rod with the collar flanges extending only in a second direction opposite the first direction.

13. The method of claim 8 wherein the fin clamp is secured to the first and second spacer rods.

14. The method of claim 8 wherein the fin clamp comprises a first bar and a second bar and a plurality of threaded fasteners, the first and second bars removably disposed on opposite sides of the first and second fin subassemblies when in the closed position, the plurality of threaded fasteners extend transversely between the first and second bars thereby restraining the first and second fin subassemblies between the first and second bars.

* * * * *